United States Patent
Conete et al.

(10) Patent No.: US 11,821,387 B2
(45) Date of Patent: Nov. 21, 2023

(54) EJECTION CONE HAVING A FLEXIBLE AERODYNAMIC ATTACHMENT

(71) Applicant: SAFRAN CERAMICS, Le Haillan (FR)

(72) Inventors: Eric Conete, Moissy-Cramayel (FR); Benoit Carrere, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 17/640,992

(22) PCT Filed: Sep. 2, 2020

(86) PCT No.: PCT/FR2020/051524
§ 371 (c)(1),
(2) Date: Mar. 7, 2022

(87) PCT Pub. No.: WO2021/044099
PCT Pub. Date: Mar. 11, 2021

(65) Prior Publication Data
US 2022/0341373 A1     Oct. 27, 2022

(30) Foreign Application Priority Data

Sep. 5, 2019   (FR) ...................................... 1909801

(51) Int. Cl.
*F02K 1/04* (2006.01)
*F02K 1/80* (2006.01)
*F02K 1/82* (2006.01)

(52) U.S. Cl.
CPC ................. *F02K 1/04* (2013.01); *F02K 1/80* (2013.01); *F02K 1/827* (2013.01);
(Continued)

(58) Field of Classification Search
CPC . B64D 33/04; F02K 1/827; F02K 1/80; F02K 1/04; F05D 2260/31; F05D 2240/1281; F05D 2220/323
See application file for complete search history.

(56) References Cited

U.S. PATENT DOCUMENTS 7,739,872 B2 *   6/2010   Murphy .................... F02K 1/78
                                                              60/770
2006/0230763 A1 * 10/2006 Johnson .................... F23R 3/60
                                                              60/740
(Continued)

FOREIGN PATENT DOCUMENTS

| EP | 0 316 233 A1 | 5/1989 |
| FR | 2 914 955 A1 | 10/2008 |
| FR | 2 978 989 A1 | 2/2013 |

OTHER PUBLICATIONS

International Patent Application No. PCT/FR2020/051524, International Search Report and Written Opinion dated Jan. 25, 2021, 9 pgs.

(Continued)

*Primary Examiner* — Todd E Manahan
*Assistant Examiner* — Rodolphe Andre Chabreyrie
(74) *Attorney, Agent, or Firm* — Cozen O'Connor

(57) ABSTRACT

The invention relates to an assembly for an aircraft turbomachine, comprising a central element (1) for the ejection of gas, and a connecting flange (9) interposed between, upstream, a gas outlet (22*a*) made of metal for a turbomachine, and, at the downstream end, the central element (1). The connecting flange comprises an annular portion (9*a*) and flexible tabs (11) having axially:
  a first end (111*a*) where the tab is connected to the said annular portion, and
(Continued)

a second free end (111*b*), projecting radially inwardly with respect to the first end and to which said tab is attached with the central element (1).

10 Claims, 3 Drawing Sheets

(52) U.S. Cl.
CPC .. *F05D 2220/323* (2013.01); *F05D 2230/232* (2013.01); *F05D 2240/1281* (2013.01); *F05D 2260/31* (2013.01); *F05D 2260/601* (2013.01); *F05D 2260/96* (2013.01); *F05D 2300/6033* (2013.01)

(56) References Cited

U.S. PATENT DOCUMENTS

| | | | | |
|---|---|---|---|---|
| 2009/0019857 A1* | 1/2009 | Tisdale | ............ | F02K 1/386 60/770 |
| 2010/0126183 A1* | 5/2010 | Conete | ............ | F02K 1/48 415/144 |
| 2018/0066605 A1* | 3/2018 | Todorovic | ............ | F02K 1/80 |

OTHER PUBLICATIONS

French Patent Application No. 1909801; Search Report dated Jun. 11, 2020; 8 pgs.

\* cited by examiner

EJECTION CONE HAVING A FLEXIBLE AERODYNAMIC ATTACHMENT

CROSS-REFERENCE TO RELATED APPLICATIONS

This application is a 35 U.S.C. § 371 filing of International Application No. PCT/FR2020/051524 filed Sep. 2, 2020, which claims the benefit of priority to French Patent Application No. 1909801 filed Sep. 5, 2019, each of which is incorporated herein by reference in its entirety.

TECHNICAL FIELD OF THE INVENTION

The present invention relates to an assembly located at the aft (downstream) end of an aircraft turbomachine for optimising the flow of hot gases expelled by the turbomachine, and possibly absorbing at least some of the noise generated by the interaction of these hot gases, coming from the engine inner parts (combustor, turbine(s), with the ambient air and with the flow of cold air expelled by the turbomachine fan.)

PRIOR ART—PRESENTATION OF THE INVENTION

More specifically, the invention concerns the connection between what is often referred to as an "ejection cone" and, just upstream, a gas outlet of the turbomachine.

Typically the ejection cone is completed (surrounded) by a portion called "primary nozzle", with the words "plug" or "tail cone" being commonly used for the ejection cone, and the words "nozzle", and as "primary nozzle" being commonly used for the nozzle.

The "ejection cone" is intended to be positioned downstream of the turbine (portion) of the turbomachine, around which the primary nozzle is concentrically placed. Both the ejection cone and the primary nozzle are attached to a turbomachine housing by an attachment system comprising flanges.

Thus, it is already known per se, an assembly for an aircraft turbomachine, comprising:
  a central element for gas ejection, annular about an axis (X) and adapted for gas to be ejected by the turbomachine around it, from upstream to downstream, and
  a connecting flange interposed between, upstream, a said gas outlet of a turbomachine and, downstream, the central element, to connect them together.

The aforementioned X-axis is the longitudinal axis, or axis of rotation, of the turbomachine (in particular of the fan 20 and the moving vanes of the engine 12 of the turbomachine shown in FIG. 1).

The central element for gas ejection can correspond to the aforementioned ejection cone (marked 1 below), or at least to the upstream portion 1a below.

A conventional ejection cone 1 is shown in FIG. 1, in which the upstream (AM) and downstream (AV) of the structure along an engine axis (X axis above) are located respectively to the left and to the right of the figure.

More generally, illustrated in FIG. 1 is a gas turbomachine for an aircraft 10, hereinafter also referred to as a turbojet engine, the central portion of which, forming the gas turbine(s) engine 12, is mounted within an engine nacelle assembly 14, as is typical of an aircraft designed for subsonic operation. The nacelle assembly 14 generally consists of a nacelle engine, known as a core 16 and a fan nacelle 18 surrounding a fan 20 located axially upstream of the engine 12.

The term "axially" means along or parallel to the X axis. The term "circumferential" refers to what extends around the X axis, and the term "radial" refers to what is radial to the X axis, i.e. along or parallel to the Z axis. The term "radially inner" is that which is radially closer to the X axis than is "radially outer".

Axially in the downstream portion, the engine 12 comprises at least one turbine (which can be a low pressure turbine) and, even further downstream, an exhaust housing 22 comprising an inner annular shroud 22a and an outer annular shroud 22b delimiting between them a downstream part of the primary stream 24 in which circulates the combustion gases from the combustion chamber of the engine 12.

Axially, the inner annular shroud 22a is connected to the ejection cone 1, which can comprise an upstream portion 1a, substantially cylindrical in shape, and a downstream portion 1b, conical in shape.

Connecting (attaching) together the aforementioned outlet of the turbojet engine, which can be the said inner annular shroud 22a, and the said central element, which can be the said upstream portion 1a of the ejection cone 1, is difficult. Indeed, as shown in FIG. 2, which illustrates in cross-section an enlargement of zone II of FIG. 1, it can be complicated to attach together axially, at the level of a bulb 7, the aforementioned outlet of the turbojet, which can be the said inner annular shroud 22a and the central element (generally marked 3) which, in the following example of the invention, will be assimilated to the ejection cone 1, the bulb 7 being a zone, swollen radially outwards, which the central element 3 can have.

In particular, problems can arise in this regard:
  management of the inlet diameter of the central element for the passage of flexible supports,
  complicated attachment, especially in connection with the use of different materials,
  sloping connections (not parallel to the X axis), in the bulb,
  leakage or deviation of the gas flow.

A proposed solution to at least some of these problems consists, on an aircraft turbomachinery assembly as mentioned above, of combining:
  a gas outlet (structure), made of metal, for a turbomachine, and
  a central element for gas ejection, as mentioned above.

On this assembly, the connecting flange presented above will comprise an annular portion and, circumferentially, flexible tabs individually presenting, axially:
  a first end towards which the tab is connected to the said annular portion, and
  a second free end to which said tab is secured with the central element, the second free end being located axially upstream of the first end, and
  on a said flexible tab of the connecting flange, the second free end will extend radially inwardly with respect to the first end.

In this text, the word "connected" means either "held in place by mechanical means" (e.g. screwed, welded) or it means "part of". If doing so creates a one-piece connection, this is specified.

In particular, such a solution makes it possible to take up the differential expansions between the said central element and the said annular portion, which can respectively belong to, or define, the metal exhaust housing and the non-metallic ejection cone.

The risk of leakage or deviation of the gas flow is limited, since the said annular portion, radially more outer than the flexible tabs, naturally forms a screen, while allowing the attachment zones to be offset radially and combining flexibility and ease of assembly.

By ensuring flexibility from downstream to upstream in the attachments via the said flexible tabs, it will also be possible to bring the attachment of the central element/ejection cone upstream, thus towards the connecting flange, this favouring an attachment zone located axially outside a said bulb and preparing the presence of an acoustic treatment zone. Dealing with the following issues together, however, has proved tricky:

relative attachment and positioning: different materials, differential expansion, risk of leakage or risk of deviation of the gas flow, effective implementation of an acoustic treatment zone that does not alter the flow or further complicate the attachments.

Taking this into account, it was proposed that, in connection with a so-called metal turbomachine outlet, the central element should have a peripheral wall:

provided with an acoustic-attenuation structure (also known as an acoustic-weakening structure), which can have a honeycomb core, and having an upstream end section upstream of the acoustic-attenuation structure:
located radially inwardly with respect to the flexible tabs, and
wherein the central element is attached with the said flexible tabs at the said second free ends thereof, so that the acoustic-attenuation structure is confined downstream of (does not project further upstream than) the upstream end portion by which the attachment with the flexible tabs takes place.

By "acoustic attenuation" is meant the use of sound-absorbing material and/or a reduction of at least one (several) ten(s) of dB compared to the same solution without said acoustic attenuation structure.

With regard to the sealing to be promoted between the said metal turbomachine outlet and, downstream, the central element, it is also proposed:

that the said annular portion of the flange (also called shroud) define a solid wall which (axially and circumferentially) will uniformly occupy the space between the metal turbomachine outlet and the said central element; and/or that the said annular portion have, at a downstream end, an annular seal with flexible fingers bearing against a radially outer surface of the central element, so as to ensure aerodynamic continuity.

This will effectively counteract the aforementioned leaks. In addition, a smooth aerodynamic stream, and thus the performance of the ejection cone, will be enhanced, with protection via the said annular portion of the flange.

Preferably, the said annular portion, which will be coaxial with the said central element, will be cylindrical. In this way, the aerodynamic continuity in the gas stream is further enhanced.

It is further proposed that, whether or not considered in combination:

a) the attachment between the central element and the said flexible tabs can comprise screws passing through them, each screw comprising a threaded rod having a head disposed radially inwardly of the upstream end portion and the flexible tabs.

This will allow the screw heads to be screwed in radially from the inside, well away from the gas stream. A small radial space between the flexible tabs and the said annular portion will suffice to place a thread, for example via a nut);

b) the flexible tabs could extend radially inwardly with respect to the annular portion, which will be extended toward upstream by a radial attachment collar, oriented radially inwards. This will promote:

the mechanical structuring and protection of the flexible tabs and their attachments, including if the upstream end of the acoustic-attenuation structure (which can be made of CMC) is attached, aerodynamic continuity in the gas stream.

It can even be possible for the acoustic-attenuation structure to extend axially to the said tabs.

Thus, it will have been possible to attach the said central element, including therefore a central element made of CMC (ceramic matrix composite, as known per se), without impacting on the acoustic treatment and without being located in the bulbous aerodynamic profile. The connecting flange can then be made of metal without difficulty. And, all the more so, this will maximise the acoustically treated surface of the central element.

The above should preferably be done:

with the said upstream end portion of the central element attachment extending parallel to the said axis (X) (thus avoiding the aforementioned sloping connections), similarly for the said tabs towards their the said second ends, so that these tabs and the said upstream end portion of the central element/ejection cone are attached together by screws passing through them.

With the said flexible tabs ensuring flexibility from downstream to upstream in the attachments, we will be able to:

gain in compactness, thus, limit the mass of the solution compared to other flexible supports, integrate, including with metallic connection flanges, architectures of central elements/ejection cones (CMC or metallic) provided with acoustic treatments related to a gas stream (see the aforementioned primary stream 24) equipped with upstream and downstream stiffeners.

The connection of the flexible tabs with the said annular portion, at their said first end, can be made by welding.

In this way, it is possible to avoid the presence of cut-outs in the annular portion which create openings where gas can pass.

It is also proposed that, in order to leave sufficient radial space at the flexible tabs and at the radial attachment between them and the central element, the support of the flexible fingers be located towards a break in the slope where the central element tapers towards the upstream end portion.

In this way, the problems of sealing, attachment, gas flow quality, attachment and access for later intervention will have been addressed together again.

The invention will be better understood, if need be, and other details, characteristics and advantages of the invention will appear upon reading the following description given by way of a non restrictive example while referring to the appended drawings wherein:

DETAILED DESCRIPTION OF THE INVENTION

Figure 1:
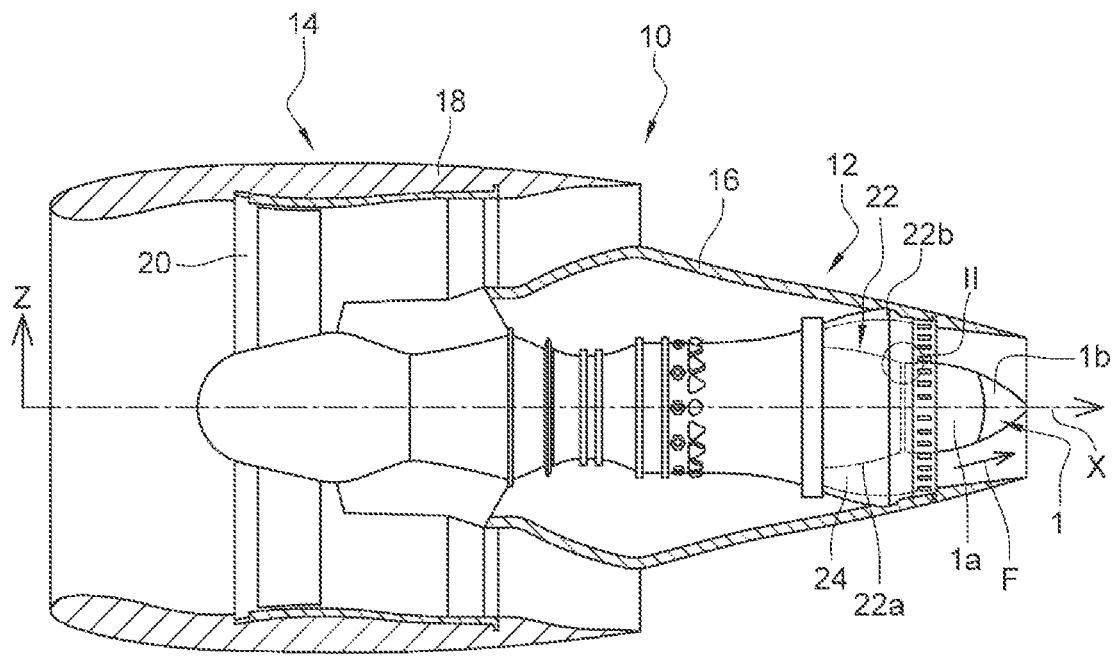
FIG. 1 is a schematic profile section (axial section) of a known aircraft turbomachine.
Figure 2:
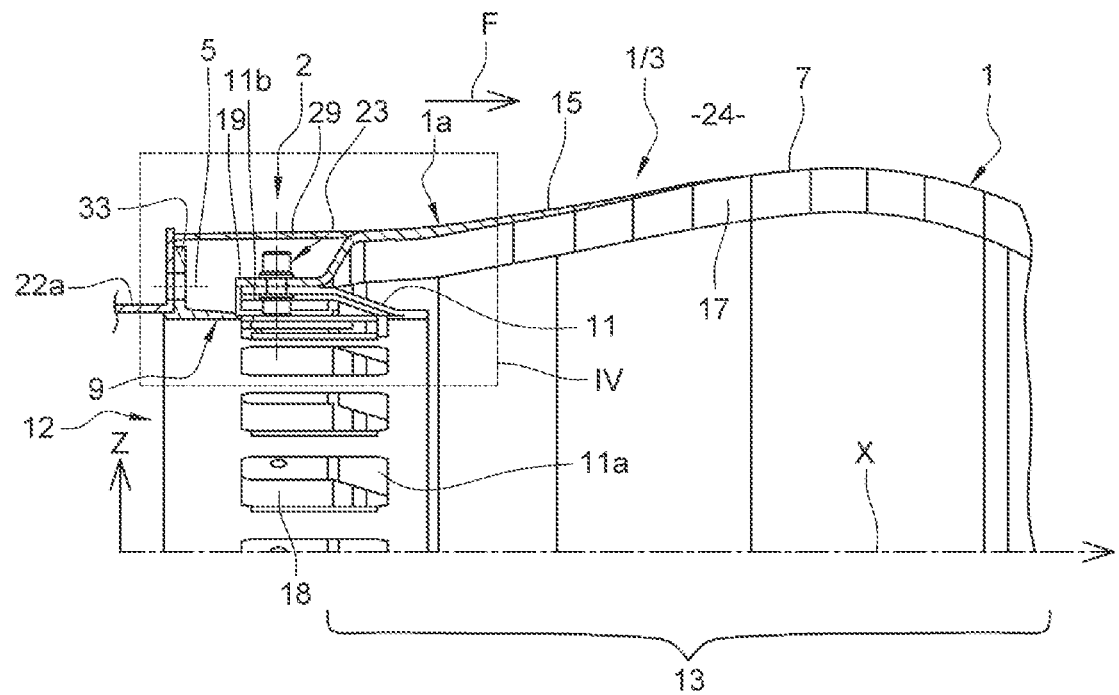
FIG. 2 corresponds in axial half-section to the local view in frame II of FIG. 1, in a version different from that of the invention.

FIG. 2 shows, with reference to FIG. 1 and therefore on a turbojet engine 10, an engine tail assembly 12, comprising a central element for gas ejection 1 (or ejection cone) and a connecting flange 9 interposed between, upstream, a metal outlet of a turbojet engine (in this case the inner annular shroud 22a of the exhaust housing) and, downstream, the said central element 1, in order to connect them together by means of axial attachments 5, which can be screws. The central element 1 is made of ceramic matrix composite and is annular around the (X) axis. It is adapted to have gas ejected by the turbojet engine around it, from upstream to downstream; see arrow F FIGS. 1, 2.

Figure 3:
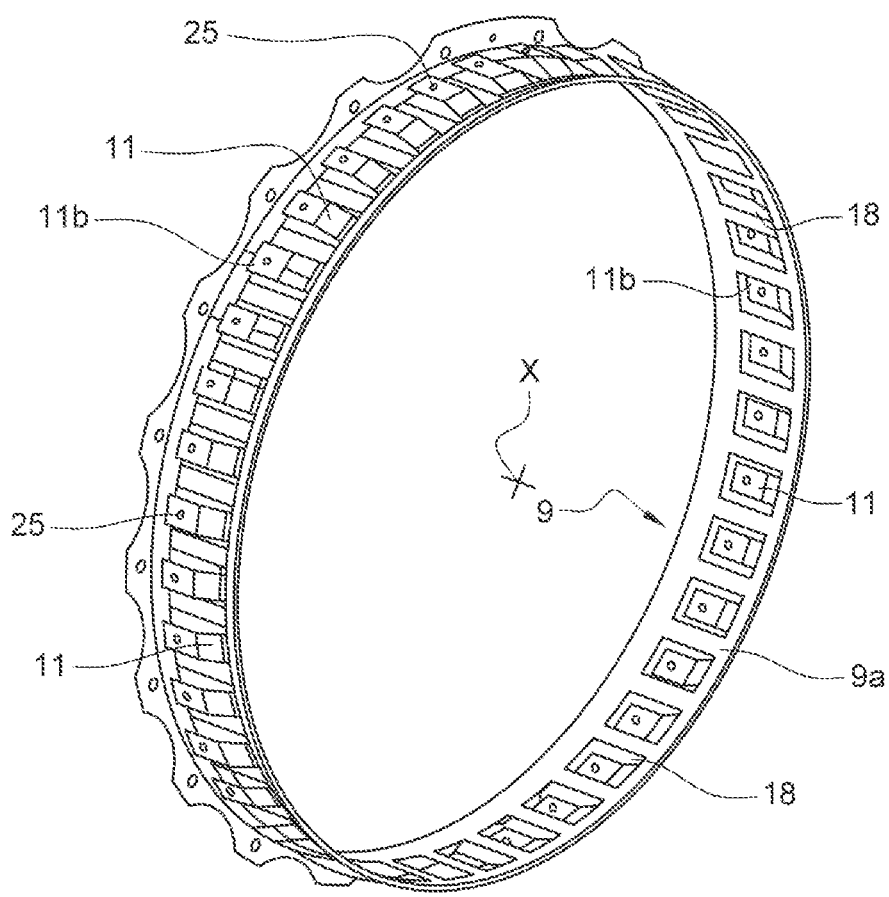
FIG. 3 is a perspective view of the connecting flange (9 hereinafter), shown in FIG. 2.

In this embodiment, not in accordance with the invention and as also illustrated in FIG. 3, the connecting flange 9 comprises an annular portion 9a, coaxial with the central element 1 and, circumferentially, flexible tabs 11.

The flexible tabs 11 follow one another circumferentially, in a regular sequence, around the X axis, on the annular portion 9a. The tabs 11 are presented as blades that can be roughly rectangular. For their flexible articulation with respect to the annular portion 9a, they have individually, axially:
- a first end 11a at which the tab is integrally connected to the said annular portion 9a, and
- a second, free end 11b, projecting radially (Z-axis) outwardly from the first end 11a and to which the tab 11 is attached with the central element 1.

Each end can therefore bend at the first end 11a. They define as many flexible supports. The central element/ejection cone 1, hereinafter referred to systematically as the 'central element', is made of ceramic matrix composite (CMC) and the connecting flange 9 is made of metal. It can be titanium alloy or any other high temperature resistant alloy.

In particular, in order not to attach the tabs 11 to the central element 1 in the zone treated for acoustic attenuation (see details below; zone 13) or in the bulb 7, the second free end 11b of a said (each) flexible tab 11, where there is attachment with the central element 1, is located axially upstream (AM) of the first end 11a of this tab.

The central element 1 has a peripheral wall 15:
- locally provided with an acoustic-attenuation structure 17 with an acoustically absorbent core, which can be honeycombed, and
- having, upstream of the acoustic-attenuation structure 17, an upstream end portion 19 where the central element 1 is attached with the said flexible tabs 11, at their second free ends 11b.

In this way, the acoustic-attenuation structure 17 is confined downstream of the portion 19 where the attachment with the tabs 11 takes place.

To make the attachment more reliable, the upstream end portion 19 favourably forms a circumferentially closed ring integrally extending the peripheral wall 15 upstream with respect to the acoustic-attenuation structure 17, like an axial. This annular rim 19 has holes 21 through which attachment screws 23 pass, which also pass through other holes 25 in the flexible tabs 11 towards their respective second free ends 11b.

In addition, in order to facilitate a large radial clearance and the fitting of attachments (such as screws 23; see FIG. 2), the flexible tabs 11 extend radially outwards from the cut-outs 18 formed in the annular portion 9a; see FIG. 3.

In practice, the central element 1 can comprise, as shown with reference to FIG. 1, the upstream portion 1a (commonly referred to as the "front plug") and, attached to it axially (for example by bolting), the downstream portion 1b (commonly referred to as the "rear plug"). It would then be this upstream portion 1a which would be equipped with at least one so-called acoustic-attenuation structure 17, and thus with the wall 15 and the portion 19. However interesting this solution may be, it can still be improved; this is the case with the solution of the invention schematised in FIG. 4 where the references are those of the previous figures increased by a hundred for the parts and pieces which correspond to each other and which are identical or similar in operation.

Figure 4:
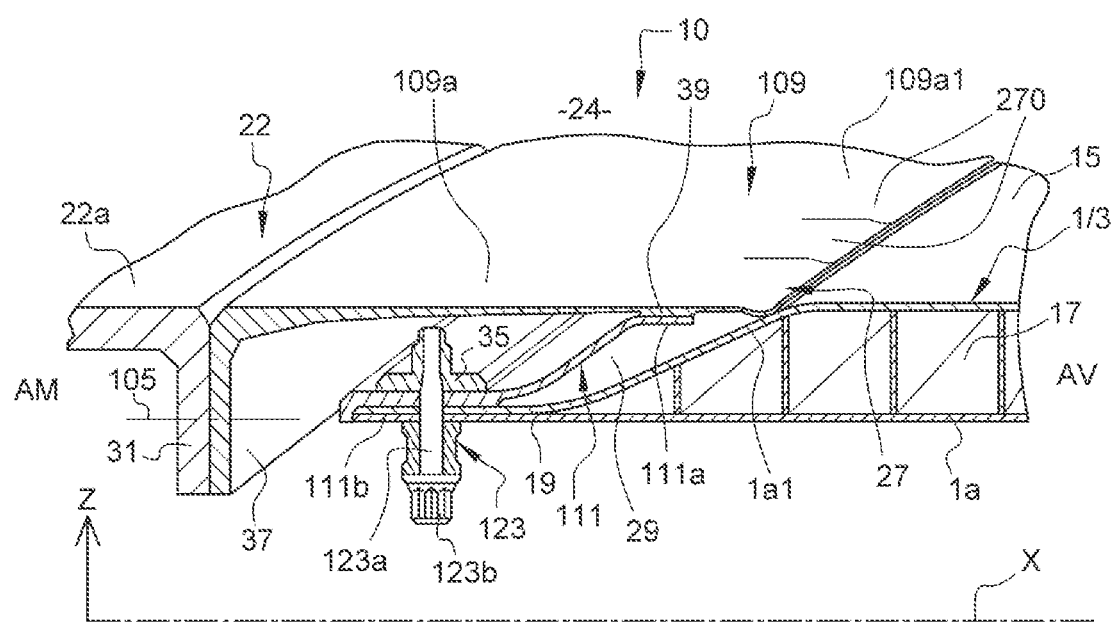
FIG. 4 corresponds to a portion of the view of FIG. 2, but in a version in accordance with the invention, at the enlargement of the area marked IV FIG. 2.

Comparing FIGS. 2 and 4, it is easy to see the similarities and differences between the two solutions. Furthermore, using FIG. 3, where the connecting flange 9 is shown in its entirety, along its entire perimeter, it is easy to transpose the cross-sectional view of FIG. 4 to the connecting flange 109 of the invention, which extends circumferentially in an identical manner to the connecting flange 9.

Hereafter, only the differences between the solutions are detailed.

Thus, in the "modified solution" of the invention, there is radially, on the (and preferably each) flexible tab(s) 111, a said free second end 111b extending radially inwardly from the first end 111a.

In this way, the risk of leakage or deviation of the gas flow is limited, since the said annular portion 109a, which is radially more outer than the flexible tabs 111, naturally forms a screen, while at the same time making it possible to offset the attachment zones radially (see attachments 105 and 123) and to combine flexibility and ease of assembly.

By ensuring flexibility from downstream (AV) to upstream (AM) in the attachments via the flexible tabs 111, it will also be possible to bring the attachment of the central element 3/ejector cone 1 upstream, thus towards the connecting flange 109.

Rather than being integral with the annular portion 109a, the flexible tabs 111 can be welded (mark 39 FIG. 4) to this annular portion at their respective said first ends 111a.

For the sealing between the said metal outlet 22 of the turbomachine 10 and, downstream, the central element 3, it is also proposed that the said annular portion 109a of the connecting flange 109 define a solid wall which (axially and circumferentially) thus uniformly occupies the space between the metal outlet 22 of the turbomachine and the said central element 3. The same objective is followed, with intended aerodynamic continuity, in that the said annular portion has, at a free downstream end 109a1, an annular seal 27 with flexible fingers 270 bearing against a radially outer surface (in the example the peripheral wall 15) of the central element 3/ejection cone 1.

In particular, the support can be located in the upstream portion 1a, towards a break in slope 1a1 where the central element 3/ejection cone 1 tapers in direction to leave sufficient radial space 29 at the flexible tabs 111 and at the radial attachments 123.

As in the solution in FIG. 2, the solution in FIG. 4 proposes that the central element 1/3 therefore has a peripheral wall 15:
provided with an acoustic-attenuation structure 17, and
having, upstream of the acoustic-attenuation structure, an upstream end portion 19:
located radially inwardly with respect to the flexible tabs 111, and
wherein the central element 1/3 is attached with the said flexible tabs 111 at their said second free ends 111*b*.

This facilitates assembly between the central element 1/3 and the connecting flange: it is possible to work radially well away from the gas stream F.

It is also proposed that the attachment between the central element 1/3 and the said flexible tabs 111 be carried out by the screws 123, which will pass through them, radially a priori. The screws 123 will each favourably comprise a threaded rod 123*a* having an enlarged head 123*b* disposed radially inwardly with respect to the upstream end portion 1*a* (and in particular its tapered portion 1*a*1) and to the flexible tabs 111.

This will allow the screw heads 123*b* to be screwed in radially from the inside. The radial space 29 can remain reduced between the flexible tabs and the said annular portion 109*a*, just sufficient to place a threaded hole therein, for example via a nut 35 engaged with the corresponding threaded rod 123*a*.

And for attachment to the metal outlet 22*a*, not only will the flexible tabs 111 advantageously extend radially inwards with respect to the annular portion 109*a*, but the annular portion 109*a* can then be extended upstream by a radial attachment collar 37, oriented radially inwards (and not outwards as in the solution of FIG. 2: outer collar or rim 33).

Moreover, aerodynamic continuity will be further encouraged with, axially, opposite the radial collar 37, an annular rim 31 for attaching the metal outlet 22*a* also oriented radially inwards (and not outwards as in the solution of FIG. 2).

All this is useful for a practical, reliable and aerodynamic connection between a metal outlet 22 and a central element 1/3 made from CMC and acoustically treated.

The connecting flange 109 can then be metallic, especially if the tapered portion 1*a*1:
extends upstream to the flexible tabs 111, radially inwards, and
also has a acoustic-attenuation structure 17.

As already indicated, the above will preferably be achieved:
with a said upstream end portion 19 for attachment of the central element 1/3 extending parallel to the said axis (X) (thus avoiding the aforementioned inclined connections),
in the same way for the tabs 111 towards their said second ends 111*b*, so that these tabs and the said upstream end portion 19 of the central element 3/ejection cone 1 be attached together, in a radially reduced space.

The invention claimed is:

1. An assembly for a turbomachine of an aircraft, the assembly comprising:
a metal gas outlet for the turbomachine,
a central element for ejecting gas, which is annular about an axis and adapted to have gas ejected around it by the turbomachine, from upstream to downstream, and
a connecting flange interposed between, upstream, the metal gas outlet, and downstream, the central element, to connect the metal gas outlet to the central element, the connecting flange comprising an annular portion, and, circumferentially, flexible tabs, each flexible tab has axially a first end and a second free end, the first ends are connected to said annular portion, and the second free ends are attached with the central element, the second free ends being located axially upstream of the first ends, and the second free ends extending radially inwardly with respect to the first ends,
wherein:
the central element has a peripheral wall,
the peripheral wall is provided with an acoustic-attenuation structure, the peripheral wall has an upstream end portion which is upstream of the acoustic-attenuation structure, the upstream end portion is located radially inwardly with respect to the flexible tabs, the upstream end portion is attached with said flexible tabs at said second free ends, so that the acoustic-attenuation structure is confined downstream of the upstream end portion,
the peripheral wall has a tapered portion extending radially inwardly toward the upstream end portion,
the flexible tabs extend between the annular portion of the connecting flange and the peripheral wall from the first ends toward the second free ends, the flexible tabs extend inwardly and only in the upstream direction, from downstream to upstream.

2. The assembly according to claim 1, wherein the attachment between the central element and said flexible tabs comprises screws passing through the central element and the flexible tabs, each screw comprising a threaded rod having a head disposed radially inwardly with respect to the upstream end portion and the flexible tabs.

3. The assembly according to claim 1, wherein the flexible tabs extend radially inwardly with respect to the annular portion, the annular portion extending upstream by a radial attachment collar oriented radially inwards.

4. The assembly according to claim 1, wherein the acoustic-attenuation structure extends axially to said tabs.

5. The assembly according to claim 1, wherein the central element is made of a ceramic matrix composite and the connecting flange is made of metal.

6. The assembly according to claim 1, wherein said flexible tabs are connected to said annular portion, at a said first end, by respective weldings.

7. The assembly according to claim 1, wherein said annular portion defines a solid wall which uniformly occupies a space between the metal gas outlet and, downstream, the central element.

8. The assembly according to claim 1, wherein said annular portion has, at a downstream end, an annular seal having flexible fingers supported against a radially outer surface of the central element, so as to ensure an aerodynamic continuity.

9. The assembly according to claim 8, wherein a support of the flexible fingers is located towards the tapered portion.

10. The assembly according to claim 1 wherein the tapered portion of the peripheral wall is provided with the acoustic structure.

* * * * *